United States Patent Office 3,697,369
Patented Oct. 10, 1972

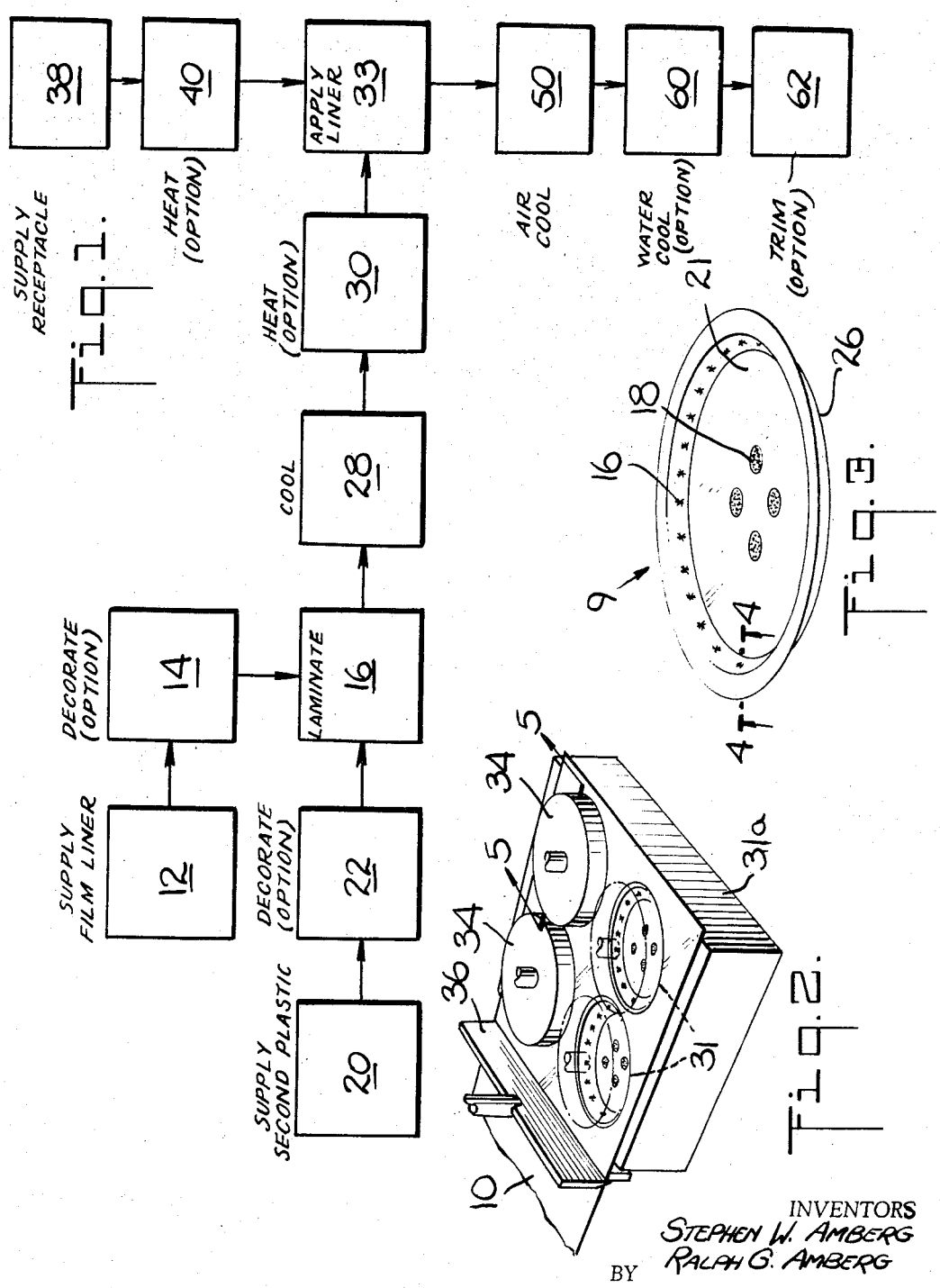

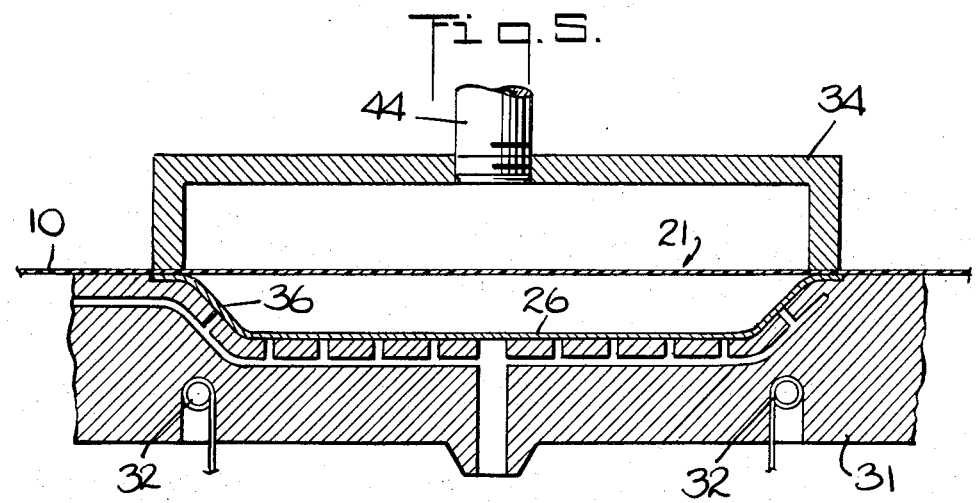
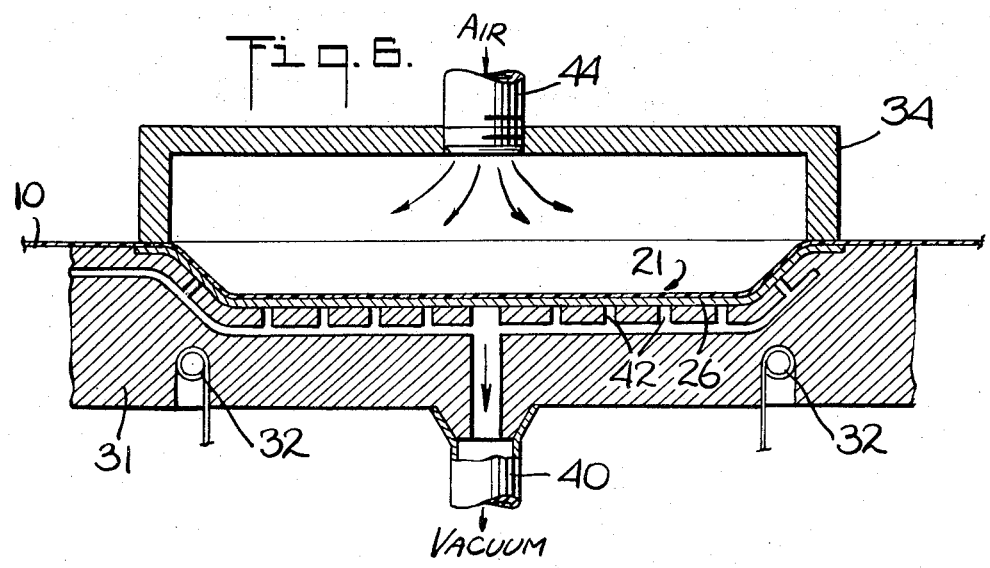
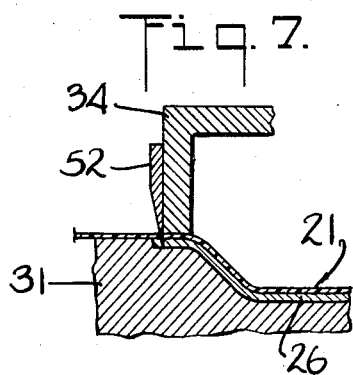
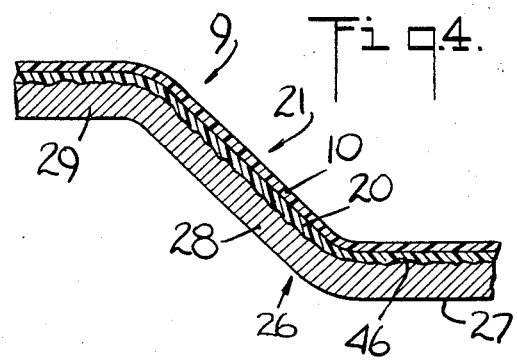

3,697,369
PLASTIC LINED RECEPTACLE OR THE LIKE
Stephen W. Amberg, St. James, N.Y., and Ralph G. Amberg, Monticello, Ind., assignors to Owens-Illinois, Inc., Toledo, Ohio
Continuation of application Ser. No. 445,926, Apr. 6, 1965, which is a continuation-in-part of application Ser. No. 415,930, Dec. 4, 1964. This application Dec. 10, 1969, Ser. No. 880,485
Int. Cl. B32b 27/10; B65d 5/56
U.S. Cl. 161—250
16 Claims

ABSTRACT OF THE DISCLOSURE

Molded pulp plate having continuous and unseamed liner of polypropylene film bonded to its interior surfaces by polyethylene. Underside of polypropylene film may be printed with decorative design. Method includes clamping a sheet of polypropylene film, having polyethylene coating on its underside surface, against the mouth rim of the plate; heating the plate and film to a temperature which is above the softening point temperature of the polyethylene material but below the softening point temperature of polypropylene; and drawing a vacuum through the bottom of the plate to press the film against the interior surfaces of the plate.

---

This application is a continuation of copending application Ser. No. 445,926, filed Apr. 6, 1965, which is a continuation-in-part of copending application Ser. No. 415,930, filed Dec. 4, 1964, now Pat. No. 3,445,892.

This invention relates to plastic lined receptacles, and more particularly to techniques for applying the liner material to the base receptacle.

Although the invention may be used in connection with base receptacles made of different materials and having different shapes, it was made during the course of attempts to improve paper plates, particularly molded pulp throw-away plates as are conventionally used as party plates, at home, or at picnics, or other places. Accordingly, the invention will be described in connection with such use.

In order to improve the texture and hardness of its usable surface and to reduce its susceptibility to deterioration by moisture or greases from foodstuffs during use, it is desirable that a paper plate be coated or lined with a grease and water-impervious relatively tough or hard material, such as plastic material. However, in the past such liner materials have not been easily or economically applied, or applied in effective manner producing either a relatively hard-finish surface for resisting knife cuts or indentations or the like, or a firm bond between the base receptacle and the liner or coating material to prevent dislodgment of the liner under the contemplated conditions of use. Effective bonding is especially important where the plate may be severely exposed to liquids during use, or where it may be exposed to high temperature such as when warming foods placed thereon by placing the plate in an oven or the like for a period of time. Today there exists a need for a relatively inexpensive paper plate having a tough or hard-finish liner rendering it impervious to liquids and greases, and capable of being placed in an oven at relatively high temperature without danger that the liner will melt or peel off.

Further, there exists a need for a paper plate which is attractively and colorfully decorated in an effective manner to increase its visual appeal at parties, picnics and the like where it may be used. Although in the past paper plates have been colorfully printed using printing inks, the ink either tends to wear off, or imparts the impression that it will either dissolve or wear off during use of the plate, thus actually detracting from the decorative appeal which the plate affords since the user may believe that the foodstuffs on the plate will be contaminated by the ink, whether or not it is the fact.

The present invention provides an improved plastic-lined receptacle, such as a paper plate, which has all of the foregoing characteristics as well as others as will become apparent. It is economically manufactured and adapted for mass production techniques using commercially available production machinery as will be seen. When formed, the lined paper receptacle is capable of retaining water at the boiling point, and capable of being placed in an oven at temperatures up to about 250° F. for a period of time, without danger that either the liner or the decoration will disintegrate or be removed.

In general, the invention contemplates the adhesive securement of a liner of a first or primary plastic film material, which is preferably transparent but which in any event has a relatively high softening point temperature, to a fibrous base receptacle by means of a second plastic film material, attractive printed decoration being preferably disposed between the two plastic materials, the second plastic material having a sotfening point temperature below that of the primary liner material. Thus, the second plastic material serves as a heat-sensitive adhesive to secure a plastic film liner, having all of the desired hardness, smoothness, and other surface characteristics, to the base receptacle.

Briefly describing the invention in its preferred embodiment, a paper dinner plate, made of molded pulp material and having interior surfaces as provided by its bottom and a diagonally upturned peripheral edge as is conventional, is provided with both attractive decoration and a liner of polypropylene plastic material on these upwardly facing interior surfaces. The polypropylene plastic liner is bonded to the surfaces of the plate by a relatively thin layer of polyethylene plastic material, a multicolored decoration having been printed on the underside of the transparent polypropylene film to be visible therethrough.

In the preferred method of lining the paper plate, the undersurface of the polypropylene sheet is printed with the colorful decoration using any conventional printing ink and process. For example, colorful floral designs or ring patterns conforming to the shape of the paper plate may serve as the referred to decoration. Preferably, these decorative patterns are formed along a continuous length of the plastic sheet material for facilitating the substantially continuous process by which the liners are applied to the base receptacles in a production line technique. The printed patterns are dried using any conventional ink drying process, whereupon the printed surface of the primary liner material is coated with a layer of polyethylene plastic material which will serve as the adhesive for bonding the thus decorated liner to the base receptacle.

The polyethylene coating is preferably in the form of a thin sheet or film which is laminated to the decorated underside surface using a conventional heat bonding lamination technique. Alternatively, a thin coating of polyethylene may be extruded directly onto the decorated surface of the polypropylene, whereupon the coating will be firmly bonded as is well known. The thus decorated and laminated liner material is then delivered to the liner-applying stage of the operation.

Either at the time the molded pulp plates are formed, or subsequent thereto in a separate process, the liner material is applied to the individual paper plates by heating either the paper plate or the polyethylene coating, or both, to a temperature whereat the polyethylene coating is rendered tacky or molten but at which the primary polypropylene liner material remains unaffected, whereupon the coated surface of the liner material is brought into firm contact with the upwardly facing or usable surfaces of the paper base plate. Upon cooling, the liner is found to be firmly bonded to the base receptacle, and it will be observed that the liner provides a hard, glossy finish revealing the attractive decorations thereunder. Of course, the liner application process includes a step of blanking out the liner material patterns, and other steps as will be described.

These and other objects, features and advantages of the invention will be apparent from the following detailed description thereof when taken with reference to the accompanying drawings in which:

FIG. 1 is a schematic diagram showing of the steps in making a decorated plastic lined receptacle in accordance with the invention;

FIG. 2 is a somewhat diagrammatic perspective view of apparatus as may be used in one of the steps of the FIG. 1 showing, being that of applying the liner to the base receptacle;

FIG. 3 is an enlarged perspective view of a finished plate according to the present invention;

FIG. 4 is a greatly enlarged sectional view taken along the line indicated at 4—4 in FIG. 3;

FIG. 5 is an enlarged vertical sectional view taken along the line indicated at 5—5 in FIG. 2, and showing the step of positioning the film across the open end of the base receptacle;

FIG. 6 is a vertical sectional view similar to FIG. 5, but showing the step of bonding the film to the surfaces of the fibrous base receptacle using fluid pressure; and FIG. 7 is a fragmentary vertical view showing the step of trimming the excess material from the peripheral edge of the receptacle.

For purposes of explaining the invention, the detailed description is directed to its incorporation into a paper plate of so-called "dinner" size as shown in its completed form in FIG. 3, although the invention may be incorporated into receptacles having different size or shape. The plate, which is generally indicated by reference numeral 9, includes a base receptacle 26 of molded pulp construction and a plastic liner 21 firmly secured thereto throughout the area of its interior, or upwardly facing surfaces. As will be described, the interior surfaces of the completed plate are colored by a multi-colored decoration 16, 18 of any desired design.

Referring to FIG. 1, there is diagrammatically illustrated a series of steps in the method of making the decorative plastic-lined plate. Generally, the steps 12 through 30 are those relating to the processing of the liner material, and steps 38 and 40 relate to the preliminary processing of the base receptacle before the liner material is applied to the base receptacle at step 33. The steps 50, 60 and 62 represent operations which occur subsequent to the liner applying step, and it will be noted that all of the steps in the method are performed in sequence as indicated by the arrowheads in FIG. 1.

Referring first to the preliminary processing of the liner material, a continuous sheet of the primary plastic liner material is drawn from a roll thereof as indicated by the step 12. Alternatively, the step 12 may represent a known type of continuous extrusion method of producing a continuous sheet of the plastic material which will be used as the liner in the completed plate 9. As generally indicated in FIG. 2, the continuous sheet of material has appropriate width for forming individual liners for two base receptacles placed side by side, although the sheet material may have width for forming only one, or perhaps more of such liners. The plastic liner material is generally indicated by reference numeral 10 in the drawings.

Although other sheet plastic material may be used, the primary plastic liner material 10 which is used in the preferred embodiment of the invention being described is transparent polypropylene film material having film thickness of from about 0.0005" to about 0.005". In the embodiment being described, the film thickness is about 0.002". Polypropylene was selected because of its relatively high softening point temperature as compared with that of the polyethylene material which will be used to bond the polypropylene to the base receptacle, as will be described. Moreover, polypropylene may be readily conditioned in known manner for adherence thereto of usual types of printers' ink, and has other characteristics such as a relatively hard, glossy and smooth surface, and resistance to penetration or distortion by greases and liquids. For the purposes of this description, it will be assumed that the polypropylene sheet material, as it comes off the roll thereof at the step 12, has an underside surface which is already conditioned for receiving printers' ink in adhesive securement thereto.

Referring now to the step 14 in FIG. 1, a decorative design 16, 18 (FIG. 3) is printed on to the underside surface of the polypropylene sheet material 10. Any conventional printing process may be employed for applying the decorative coating which may include a multicolor arrangement. For example, a sheet of plastic material 10 may have a first design 16 of one color printing ink, and a second design 18 of different color printed in register with the first design 16 in a subsequent step which may or may not be preceded by a drying step for drying the ink of the first design 16, depending upon the printing process employed. The inked patterns are in any event dry after the printing process.

As indicated by reference numeral 20 in FIG. 4, an overlying layer or coating of polyethylene, which will serve as the bonding material for securing the plastic film 10 to the base receptacle 26, is laminated to the underside of the film 10 in superposed relation to the printed matter 16, 18 thereon, the latter being then between the polyethylene coating 20 and the underside surface of the film 10. Nonoriented polyethylene was selected because it has a softening point temperature between about 220° F. and about 265° F., such being from about 10° F. to about 90° F. lower than the softening point temperature of the polypropylene material which is employed as the basic liner 10. In this connection, it will be noted that polypropylene sheet material, which was selected as the sheet material 10, has a softening point temperature of from about 275° F. to about 320° F. depending upon the process by which the polypropylene sheet is made. Moreover, polyethylene is easily heat bonded to polypropylene, and will also bond nicely to the molded paper pulp material of which the base receptacle 26 is made. The sheet or coating 20 of polyethylene material preferably has a thickness from about 0.0005 inch to about 0.004 inch but, in any event, may be very thin as compared to the thickness of the liner material 10.

The step 20 in FIG. 1 indicates a roll of polyethylene sheet material 20, having width equal to that of the polypropylene liner material 10, in position to be heat-bonded to the latter by any conventional film lamination process. The step 22 represents an available alternative printing process for printing the referred to colorful decorations 16, 18, or one of them, directly on to the upperside surface of the polyethylene film 20 rather than on to the underside sulface of the polypropylene liner film 10. However, it will also be understood by those having skill in the art that the polyethylene coating 20 might also be formed in an extrusion process, as the step 20 may also indicate, in which event the polyethylene coating is extruded directly on to the underside surface of the liner material 10 in a continuous process. Where such alternative is used the printing step 22 is, of course, omitted. Whether the polyethylene coating 20 is extruded directly onto the polypropylene liner 10, or whether the polyethylene 20 is initially prepared in sheet form and subsequently either printed or not and secured to the liner 10, the lamination of the polyethylene and polypropylene plastic materials is indicated by the step 16 in FIG. 1.

The subsequent step 28 represents a cooling step in the lamination process, at which the now printed laminated liner material may be wound on a roll or otherwise temporarily stored prior to its being applied to the base receptacles 26.

Referring to FIG. 1, reference numeral 38 indicates the molding step wherein the base receptacle 26 is formed by molding from a slurry of fibrous pulp material by any suitable conventional apparatus. Generally, such apparatus includes a molding die and a heated drying die whereby a relatively firm and rigid open top receptacle is made. When formed, and as illustrated in the enlarged showing of FIG. 4, the molded base receptacle is indicated generally by reference numeral 26, and includes a bottom portion 27, a diagonally upwardly extending side wall portion 28 and a radially outward projecting mouth rim portion 29, the side wall and bottom portions providing interior surfaces of the receptacle as will be understood.

Referring now to the steps employed in bonding the plastic liner material 10 to the base receptacle 26, the base receptacle 26 is either left within the mold within which it was formed or transferred to a liner-applying mold which conforms to the shape of the underside surface of the receptacle, either of these molds being somewhat diagrammatically illustrated by the holder or die 31 in FIGS. 5 and 6. The base receptacle 26 will either contain residual heat from the molding process by which it was made or will be preheated to a temperature about equal to or higher than the softening point temperature of the polyethylene coating 20, but below the softening point temperature of the polypropylene liner material 10, such heating being indicated in FIG. 1 by the step 40. Where a separate holder or die 31 is used, the same is heated by heating elements therein, as generally indicated by reference numeral 32 in FIGS. 5 and 6. However, it should be noted that, although such preliminary heating of the base receptacle 26 is preferred, the application of a liner thereto in accordance with the present invention has been successfully carried out where the base receptacle was not preliminarily heated.

Similarly, and referring to step 30 in FIG. 1, the polyethylene coating 20 on the film 10 is preheated, as by passing the film over a heated roller, the preheating being to a temperature above that at which the polyethylene coating 20 is rendeed tacky or molten. Such preliminary heating is the step occurring immediately prior to the positioning of the heated film, coated side down, on and across the peripheral rim 29 of the base receptacle 26, as indicated in FIG. 5. However, it should be here noted that the coated film 10 need not be preheated, and the step 30 may be eliminated, where the molded base receptacle 26 is preliminarily heated in the step 40 to a temperature above the softening point temperature of the polyethylene coating 20 on the film. That is, either the film or the base receptacle may be preheated, or both of them may be preheated, the latter being preferable.

The liner film is applied to the base receptacle in the step designated 33 in FIG. 1, and which is illustrated in detail in FIGS. 2, 5 and 6. As shown in FIG. 2, the base receptacle holder or die 31 may be one of four such dies contained in a quadruple mold which is generally indicated by numeral 31a, thus providing two rows, of two receptacles each, to which individual liners 21 will be applied. As best seen in FIGS. 2 and 5, in the step 33, a length of the film 10 is drawn over the unit 31a to a position whereat four of the printing patterns 16, 18 are respectively disposed in alignment with the four base receptacles 26. An annular clamp ring 34 is disposed above and in alignment with each of the dies 31, all of the clamp rings 34 being mounted for simultaneous vertical movement from a position in spaced relation above the respective dies 31 (not illustrated) to respective positions in clamping engagement with the respective peripheral rim portions 29 of the base receptacles, as indicated in FIGS. 2 and 5.

Referring briefly to FIG. 7, it will be understood that a peripherally extending and downwardly projecting knife 52 may be attached to each clamp ring 34 for blanking out the individual liners 21 from the continuous film material 10 commensurate with the movement of the clamp rings 34 to their clamping positions as shown in FIG. 5. Alternatively, and as indicated in FIG. 2, the film material from which the four separate liners 21 are formed may be severed from the elongated film web by means of a vertically actuated knife 36. However, where such alternative is used, it will be appreciated that a subsequent film trimming operation will be necessary to separate the lined receptacles either after or commensurate with the forming thereof.

Referring again to FIG. 5, it will be appreciated that during the positioning of the film 10 across each base receptacle 26, the die 31 continues to be heated by the heating coils 32.

The step of actually applying the liner to the base receptacle is shown in detail by FIG. 6. Referring to FIG. 6, it will be understood that the bottom die 31 has a bottom connection 40 leading to a vacuum source (not illustrated). The bottom of the die 31 is provided with a plurality of vacuum openings 42 which allow a vacuum to appear at the underside surface of the base receptacle 26. Because the base receptacle is made from porous material, the vacuum may be drawn therethrough, and in this manner a vacuum applied at the connection 40 draws the individual liner 21 down into firm, contiguous conforming relation with the interior surfaces of the base receptacle 26. To assist in providing the firm engagement between the liner and the base receptacle during this stage of the operation, the clamp ring 34 is in the form of a top cover for the assembly and is provided with a centrally disposed air connection 44 through which air pressure may be directed on to the upper or outer surface of the film liner 21. As a specific example of the practice of the preferred embodiment of the invention, a vacuum of between about 3" and about 4" of mercury is applied through the connection 40 of the die 31, and air pressure of from about 40 to about 50 p.s.i. is applied to the upper surface of the liner 21 for the period of time required to establish the firm engagement, which is about two seconds. Although a combination of positive air pressure and vacuum pressure as described is preferred, either one or the other may be used alone for the purpose of providing firm engagement at the now heated interface between the liner 21 and base receptacle 26.

Further, it should be particularly noted that the temperature to which the film liner 21 or the base receptacle 26, or both, is heated during the liner applying step 33 is such that the polypropylene primary liner material 10 is not rendered tacky or softened in any manner. That is, the temperature is above that at which the polyethylene coating 20 is rendered molten, but below that at which the basic liner material 10 is rendered molten. In this connection, it should be noted that the periphery of the clamp ring 34, which engages the plate peripheral portion 29 and the overlying peripheral portion of the liner film 21 to press the same firmly together, should be heated to the same temperature (by means not shown) so that the film is firmly bonded to the periphery of the plate. The material 10 in the individual liner 21 thus retains its hard, smooth, glossy finish, and its transparent nature, throughout the bonding step. Because of the transparent nature of the film 10, it will further be noted that the colors of the designs 16 and 18 show clearly therethrough and present the desired attractive appearance at the upper surface of the completed plate 9. Considering the relative softening point temperatures of polyethylene and other plastic sheet materials, it should also be noted that other plastic film materials having the required surface characteristics and stretchability, such as polyolafins (polypropylene, polyethylene, etc.), may be used as the primary liner material 10. For example, polyethylene having a softening point temperature of above 250° F., and in any event above that of the perhaps lower density polyethylene which is used as the bonding material, may be satisfactorily employed.

As illustrated by reference numeral 46 in the detailed showing of FIG. 4, the upper surface of the base receptacle 26 is more often stippled or otherwise rough and irregular due to the inherent nature of the pulp molding process. In such case, it is believed that the heated coating material 20 melts and flows down into interstices between the fibers of the base receptacle 26 and, upon cooling, grips the fibers and becomes firmly bonded thereto. Alternatively, and probably depending upon how close to the softening point temperature of the coating 20 the liner 21 is heated, the liner 21 and its coating 20 may span across these interstices and be firmly bonded only to the high points of the stippled pattern. In any event, and whether or not the surface of the base receptacle is stippled or roughened, it will be found that, after cooling, the liner 21 is extremely smooth and hard at its upper or usable surface after the plate 9 has been formed in the manner described.

Referring again to FIG. 1, reference numerals 50 and 60 indicate cooling steps one or both of which may be used to quickly cool the now fully lined plate 9 to a temperature below the softening point temperature of the coating 20, and thus the bond between the liner 21 and the base receptacle 26 is made permanent. Although not illustrated, step 50 indicates the opening of the mold by lifting the clamp ring 34 out of engagement with the peripheral rim portion 29 of the plate 9. During this operation, the vacuum on the underside of the plate is continued so as to assure that the still hot liner 21 maintains its firm engagement with the base receptacle. The air pressure through the sealing ring 34 is also maintained for a brief period when the mold is opened and while the ring 34 is still in close proximity to the plate 9, whereupon the blow of air serves to somewhat cool the liner 21, drawing in air at room temperature. Alternatively, a high vacuum of from about 16 inches to 18 inches of mercury can be applied through the top of the clamp ring at the air connection 44 when the mold is partially open so as to draw in air at atmospheric temperature. Such blow of air or vacuum may be sufficient to adequately cool the plate. However, if desired, the plate may be further cooled, or completely cooled, by a stream of cold water poured into the plate, as indicated by step 60 but not illustrated in detail.

Also referring to FIG. 1, and depending upon whether or not a subsequent trimming of the liner material is required, the plate forming process may include a liner trimming step 62. Although not illustrated, such trimming step may also include a trimming of the peripheral portion 29 of the base receptacle 26 to reduce its size as may be desired. The trimming step is analogous to that shown in FIG. 7 insofar as a ring-shaped vertically actuated blade 52 is directed downwardly to trim the excess film and base material from the periphery of the plate 9.

With regard to coating 20 which serves as the heat sensitive adhesive bonding material, although polyethylene sheet material has been found most satisfactory, where polypropylene is used as the primary liner material, other plastic materials having the requisite characteristics as compared with the primary liner material might also be used. In any event the adhesive coating may be relatively thin such that, for example where polyethylene is used, the ultimate thickness of the dried coating in the finished plate 9 is only about 0.0002″. Further, a relatively thick film of polyethylene may be used where the heating thereof, during the step of applying it to the receptacle 26, is relatively rapid so that only its underside surface is rendered tacky.

The softening point temperature differential between the coating 20 and the film 10 should be from about 20°–30° F. for practical reasons and, where polypropylene sheet material is bonded to a receptacle using polyethylene, this differential is preferably somewhat higher. For example, a polypropylene liner having a softening point temperature of 320° F. would be applied to the base receptacle 26 using polyethylene having a softening point temperature of about 220° F. the liner 21 being applied at a temperature of about 240° F. to 270° F., preferably 260° F.

It should further be noted that, where polyethylene or other plastic material in sheet form is used as the bonding material, the lamination of the same to the primary liner material can be commensurate with the step of applying the liner to the base receptacle. That is, and referring briefly to FIG. 5, the decorated polypropylene liner material 10 and an underlying but separate sheet of polyethylene may be simultaneously positioned over the die 31 whereupon, during the liner applying step 33 as illustrated in FIG. 7, the polyethylene will be simultaneously secured both to the base receptacle 26 and to the underside of the film 10. In such process, only the underlying base receptacle 26 is heated to a temperature above the softening point temperature of the polyethylene but below that of the polypropylene.

The completed plate 9 will withstand temperatures of from 240° F. to 260° F. over long periods of time without loosening or heat distortion of its liner 21.

Thus has been described a decorative plastic-lined receptacle and a method for making the same which achieves all of the objects of the invention.

What is claimed is:

1. The method of applying a plastic film liner in initially flat sheet form to all of the interior surfaces of an open topped receptacle of paper material having configuration providing a mouth rim at its open top and at least an interior side wall surface extending generally downward from said mouth rim, comprising the steps of positioning said plastic film liner sheet on and spanning across said receptacle mouth rim, said plastic film having hard, glossy and smooth surface characteristics and further characterized as being resistant to penetration and distortion by grease and comestible liquids, said plastic film further having a softening point temperature which is higher than polyethylene, stretching and pressing said plastic film liner sheet into substantially contiguous conforming relation with said receptacle surfaces while holding said plastic film liner sheet against said receptacle mouth rim and while heating polyethylene material, disposed between said liner sheet and said receptacle surfaces, to a temperature at least equal to the softening point temperature of the polyethylene material but below said softening point temperature of said plastic film and while maintaining said plastic film below its softening point temperature, and subsequently cooling said polyethylene material to a temperature below its said softening point temperature, whereby said polyethylene material adhesively secures said plastic film liner sheet to said receptacle surfaces and said characteristics of the plastic film are retained.

2. The method according to claim 1 wherein said plastic film liner is polypropylene film.

3. The method according to claim 2 wherein, prior to said positioning step, a dryable ink decoration is applied to and dried on one surface of said polypropylene film, and said polyethylene material is a thin film of polyethylene laminated to said one surface of the polypropylene film in superposed relation with respect to said ink decoration thereby forming a laminated sheet of material which is then so positioned with said polyethylene material facing said receptacle surfaces to be lined.

4. The method of applying a polyolefin plastic liner to an open topped receptacle having configuration providing a mouth rim at its open top and at least an interior side wall surface extending generally downward from said mouth rim, comprising the steps of positioning a flat sheet of thin polyolefin plastic film material on and across said receptacle mouth rim, said plastic film material having hard, glossy and smooth surface characteristics and further characterized as being resistant to penetration and distortion by grease and comestible liquids, said sheet having on that surface thereof which faces said receptacle a coating of a second plastic material having a softening point temperature which is lower than that of said polyolefin plastic film material, holding said sheet against said receptacle mouth rim, applying fluid pressure to said sheet to stretch and press the same into contiguous conforming relation with all of the surface of said receptacle below its said mouth rim while applying heat to said sheet and coating at a temperature which is lower than the softening point temperature of said polyolefin plastic film material but at least equal to said softening point temperature of said second plastic material, and then cooling said sheet and coating to a temperature below said softening point temperature of said second plastic material, whereby said second plastic material bonds said polyolefin plastic film material to said receptacle surface and said characteristics of the polyolefin plastic film material are retained.

5. The method according to claim 4 wherein said polyolefin plastic film liner sheet is polypropylene film material.

6. The method according to claim 4 wherein said polyolefin plastic film liner sheet is polyethylene film material.

7. The method according to claim 6 wherein said second plastic material is polyethylene material having lower density than said polyethylene film liner material.

8. The method according to claim 4 wherein said second plastic material is a flat sheet of plastic film material which, during said positioning step, is also positioned on and spanning across said receptacle mouth rim immediately adjacent that side of said polyolefin plastic film liner sheet which faces said receptacle surfaces, said holding including holding said sheet of second plastic film material against said receptacle mouth rim.

9. The method according to claim 8 wherein said second plastic material is plastic film material which is laminated on to that side of said polyolefin plastic film liner sheet which faces said receptacle surfaces, whereby said second plastic material is initially an integral portion of said sheet.

10. The method according to claim 4 wherein said receptacle configuration further provides a bottom, said receptacle being a plate of molded pulp material, said plastic film material is polypropylene, said second plastic material is polyethylene, and said step of applying fluid pressure comprises drawing a vacuum through said receptacle bottom.

11. The method according to claim 4 wherein said receptacle is heated to said heating temperature prior to said step of applying fluid pressure.

12. The method according to claim 4 wherein said sheet is heated substantially to said heating temperature immediately prior to said positioning step.

13. The method according to claim 4 wherein said applying of fluid pressure comprises applying air pressure to the exposed surface of said sheet, and said cooling step comprises maintaining said air pressure on said sheet.

14. The method according to claim 4 wherein said cooling step comprises applying a vacuum over the exposed surface of said sheet to draw air at room temperature across the latter.

15. A dinner plate or the like of molded pulp material having a continuously extending, unseamed liner of polypropylene plastic film material bonded to, and lining all of the upwardly facing surfaces thereof, said liner being fully bonded to said surfaces by polyethylene plastic material.

16. A receptacle according to claim 15 wherein decoration material is disposed between said polypropylene plastic film material and said polyethylene plastic material.

References Cited

UNITED STATES PATENTS

| | | |
|---|---|---|
| 2,150,910 | 3/1939 | Chaplin. |
| 2,311,156 | 2/1943 | Casto _____ 161—413 X |
| 2,590,221 | 3/1952 | Stevens _____ 156—306 X |
| 2,956,723 | 10/1960 | Tritsch. |
| 3,187,982 | 6/1965 | Underwood et al. |
| 3,255,843 | 6/1966 | MacDonald. |
| 3,262,808 | 1/1966 | Crooks et al. |
| 3,318,748 | 5/1967 | Hurst. |
| 3,325,329 | 6/1967 | Bolesky. |

FOREIGN PATENTS

| | | |
|---|---|---|
| 555,219 | 4/1958 | Canada. |

JOHN T. GOOLKASIAN, Primary Examiner

J. C. GIL, Assistant Examiner

U.S. Cl. X.R.

156—160, 163, 212, 214, 224, 229, 285, 306, 321, 322, 334; 161—252, 270, 413; 229—3.1, 3.5, 30